No. 790,527. PATENTED MAY 23, 1905.
J. B. SALO & A. H. HOAG.
WEIGHING MECHANISM FOR REFRIGERATORS.
APPLICATION FILED JAN. 18, 1904.
3 SHEETS—SHEET 1.
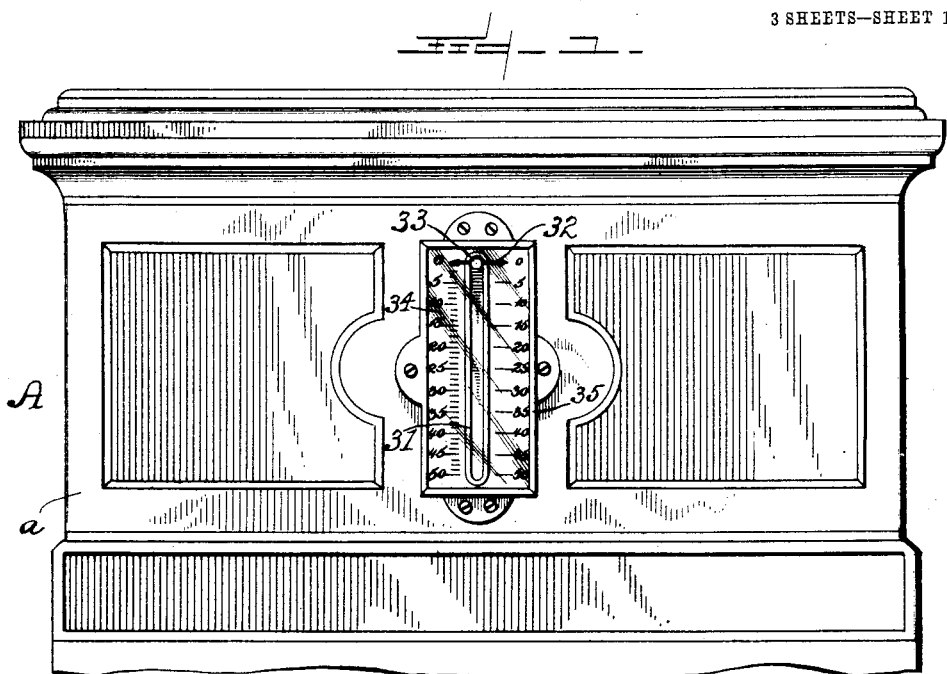
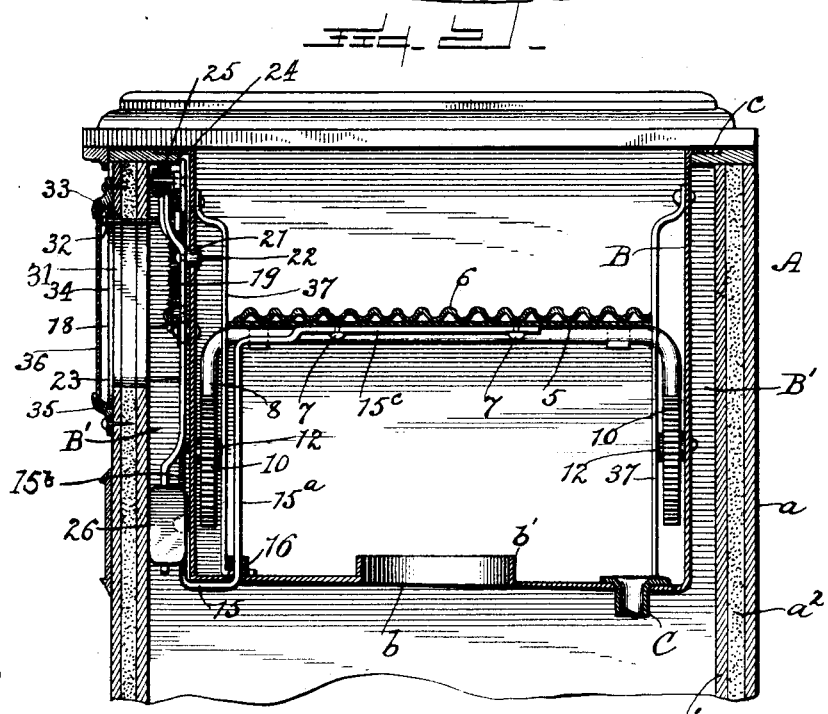
WITNESSES:
G. P. Kingsbury
R. B. Cunnagh
INVENTORS:
John B. Salo and
Andrew H. Hoag
BY
Griffin Bernhard & Cavanagh
ATTORNEYS

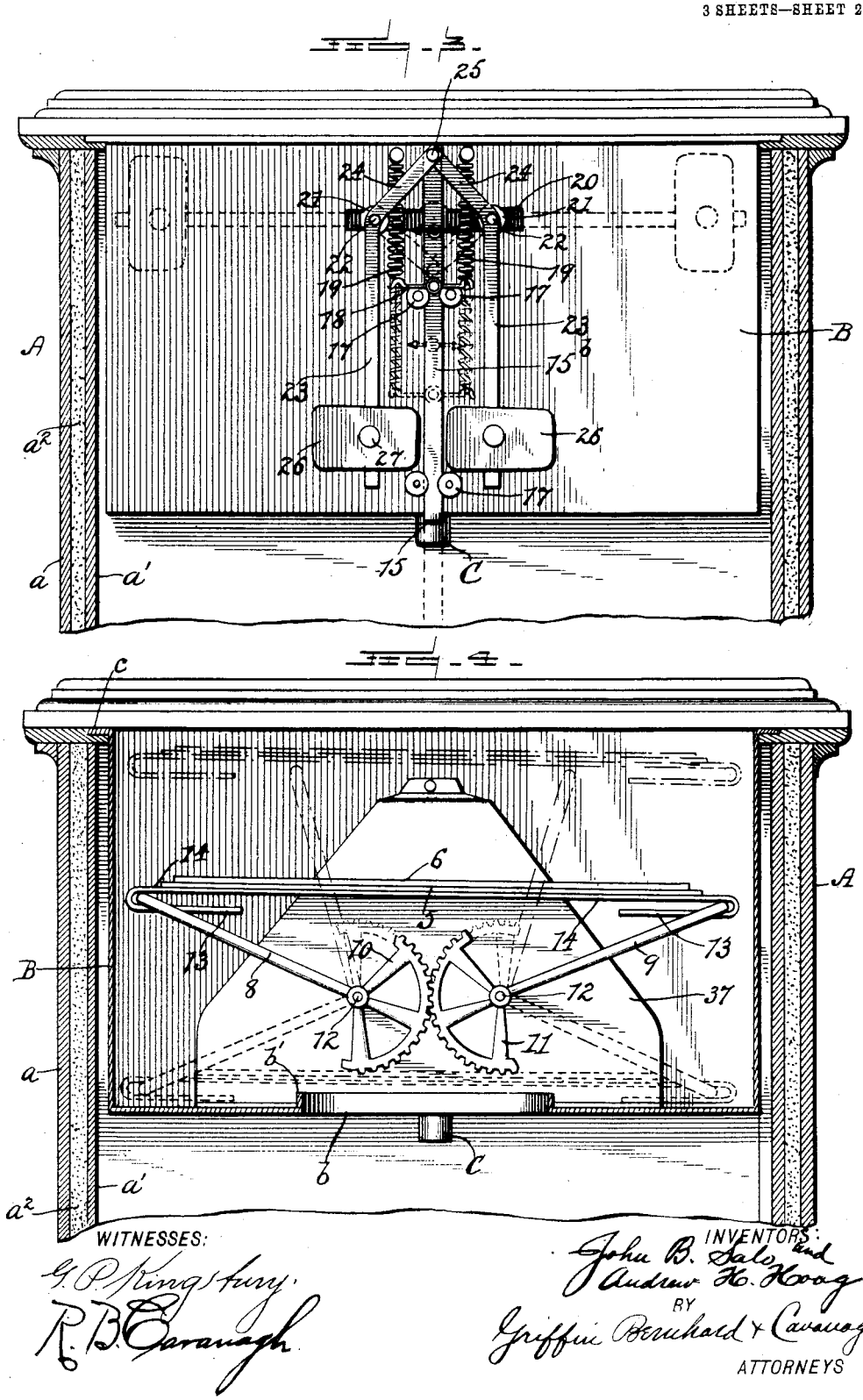

No. 790,527. PATENTED MAY 23, 1905.
J. B. SALO & A. H. HOAG.
WEIGHING MECHANISM FOR REFRIGERATORS.
APPLICATION FILED JAN. 18, 1904.
3 SHEETS—SHEET 3.
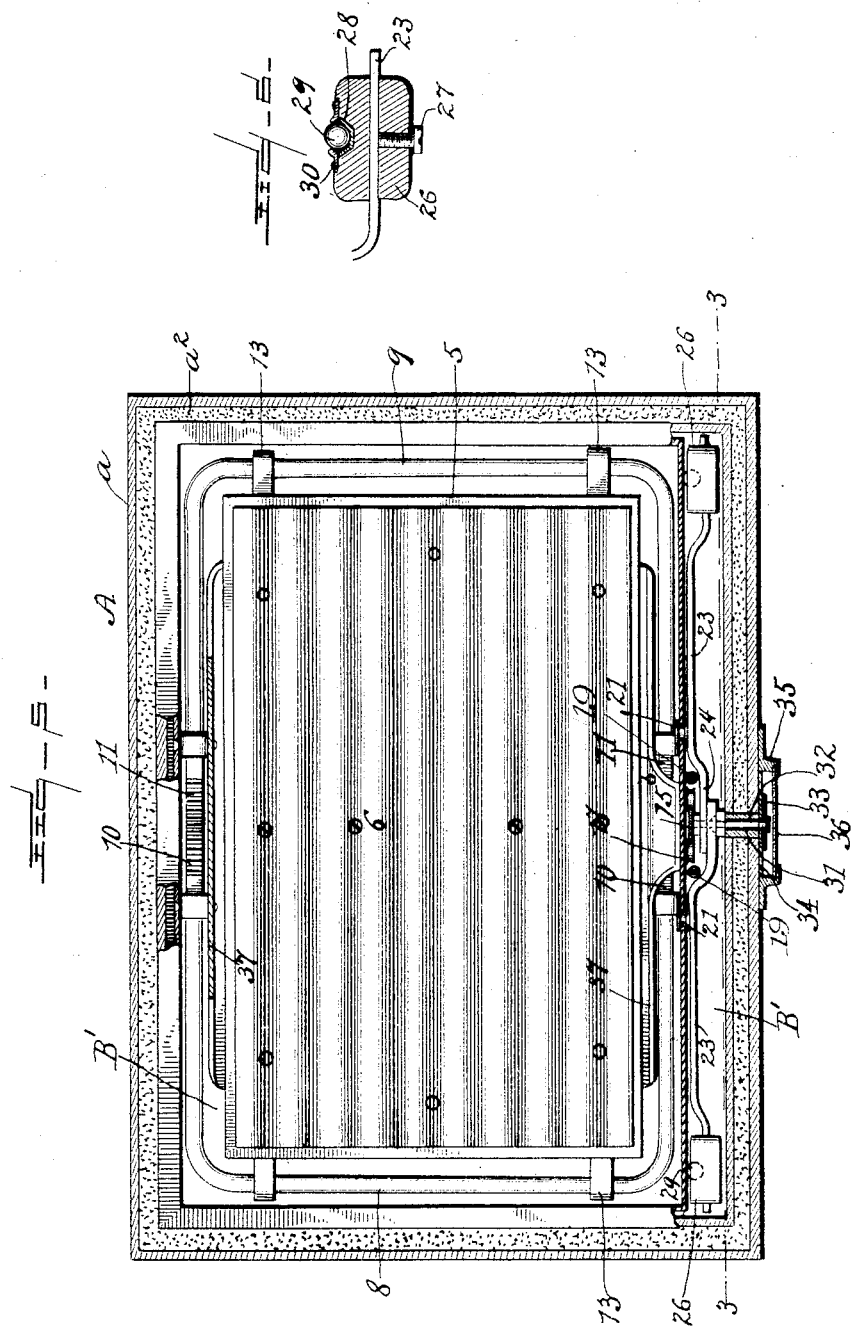
WITNESSES:
INVENTORS:
John B. Salo
Andrew H. Hoag
BY
Griffin Bouchard & Cavanagh
ATTORNEYS No. 790,527. Patented May 23, 1905.

UNITED STATES PATENT OFFICE.

JOHN B. SALO AND ANDREW H. HOAG, OF NEW YORK, N. Y.

WEIGHING MECHANISM FOR REFRIGERATORS.

SPECIFICATION forming part of Letters Patent No. 790,527, dated May 23, 1905.

Application filed January 18, 1904. Serial No. 189,481.

*To all whom it may concern:*

Be it known that we, JOHN B. SALO and ANDREW H. HOAG, citizens of the United States, residing at the city of New York, borough of Manhattan, in the county and State of New York, have invented a new and useful Improvement in Weighing Mechanisms for Refrigerators, of which the following is a specification.

Our invention relates to improvements in weighing mechanisms for refrigerators, by which the owner is able to ascertain at a glance the quantity or weight of ice deposited in the refrigerator.

In this invention we seek to produce an improved construction wherein the operativeness of the mechanism is not affected by the shock or jar on the platform incident to the act of dropping a quantity of ice thereon, thus producing a structure which is not liable to injury by ordinary service.

We equip the weighing mechanism with means which is effective in maintaining the platform in a horizontal position at all times and irrespective of the position of the load thereon, whereby the platform is held from tilting at either side or end and the several coöperating devices are prevented from binding. We also contemplate the provision of means for readily dismounting the load-platform from certain permanently-installed parts of the weighing mechanism, thus allowing the ice-tank and the platform to be readily cleansed.

Our improved mechanism has the several parts so constructed and arranged that the friction and wear between the surfaces will be minimized.

The indicating devices of our weighing mechanism are exposed on the outside of the refrigerator in order that the quantity of ice may be ascertained at any time by a glance at the dial and without opening the cover of the refrigerator.

The improved mechanism may be used by housekeepers and others for ascertaining the weight of any substance in addition to the use of the mechanism as an ice-scales.

Further objects and advantages of the invention will appear in the course of the subjoined description and the actual scope thereof will be defined by the annexed claims.

Reference is to be had to the accompanying drawings, forming a part of this specification, in which corresponding characters of reference are used to denote like parts in each of the several figures.

Figure 1 is an elevation of a portion of a refrigerator, showing the indicating mechanism associated with the improved weighing devices of our invention. Fig. 2 is a vertical transverse sectional elevation through a refrigerator having our weighing mechanism installed therein. Fig. 3 is a longitudinal sectional elevation taken in the plane of the dotted line 3 3 of Fig. 5, showing the counterbalance devices of the weighing mechanism in elevation. Fig. 4 is a longitudinal sectional elevation taken centrally through the refrigerator, showing the normal position of the platform by full lines, the two dotted-line positions indicating the depressed loaded condition of the platform and an abnormally raised position of the platform for removing it from the ice-chest. Fig. 5 is a sectional plan view through the refrigerator with our weighing mechanism applied thereto. Fig. 6 is a detail view of one of the counterbalance-weights, showing the ball-bearings therefor.

In order that others skilled in the art may understand our invention, we have shown it applied to any ordinary type of domestic refrigerator, which is indicated in its entirety by the reference character A, the outer casing of said refrigerator being indicated at $a$, the interior lining at $a'$, and the packing or filling at $a^2$. It is to be distinctly understood, however, that we do not restrict ourselves to the use of the improved weighing mechanism in connection with any particular type of refrigerator, nor, in fact, to the class of refrigerators, because certain parts of our weighing mechanism may be employed generally in the arts.

Within the upper part of the refrigerator A is arranged an ice chest or tank B, which may be supported in place by any suitable means; but as here shown this chest is suspended in position by an upper marginal flange $c$, resting on the top edge of the structure. In the bottom of the ice-chest is a circulation-opening $b$, which is bounded by an upturned marginal flange $b'$, and to the bottom part of the chest is connected an ordinary drain-pipe C. These parts may be of the usual or any preferred construction; but the chest is of such size that spaces B' are provided between the sides of the refrigerator and the chest for the accommodation of parts of our improved weighing mechanism. (See Figs. 2 and 5.)

Inside of the ice-chest is arranged a horizontal platform 5, which is mounted for vertical movement in said chest and is held in a horizontal position at all times by certain devices of our invention, thus preventing the platform from tilting at either side or end by improper distribution of the load of ice thereon and overcoming any tendency of parts of the scale mechanism to bind and work improperly. Another important advantage in our means for supporting the platform in a horizontal position at all times resides in the ability of the devices to successfully withstand the shock and jar due to the dropping of a load of ice into the refrigerator and upon the scale-platform. Said platform may be of any suitable construction, and as herein shown it consists of a flat metallic plate on which is placed an ice-rack 6, the latter presenting a surface which prevents the ice from sliding toward the sides of the ice-chest. This rack 6 is also made of metal, and it is provided with longitudinal corrugations that produce a plurality of corresponding channels into which the ice when melted will sink and lodge, thus holding the load against movement toward the sides of the refrigerator. If desired, the ice-rack may be constructed in any suitable way and of other materials, and said rack may be fastened by removable devices, such as screws or bolts 7, to the platform or it may merely rest thereon.

We employ two bails 8 9 as the means for primarily supporting the platform, said bails being provided at their end portions with the toothed or gear segments 10 11, whereby the bails have mutual intermeshing engagement for insuring the simultaneous and equal movement thereof. The bails are disposed inside of the ice-chest for the toothed segments thereof to have opposing or facing relation and the bails are fulcrumed to the sides of the ice-chest by bolts 12 or their equivalents, said bolts passing centrally through the gear-segments of the bails and the sides of the ice-chest, as shown by the drawings. The bails are thus arranged reversely to one another within the chest for the cross-bars of the bails to lie next to the ends of the chest, and although the bails are fulcrumed individually within the chest they are geared directly one to the other for equal and conjoint movement in arcuate paths. The platform and the ice-rack thereon are not as wide as the spaces between the side arms of the bail (see Fig. 5) and the platform is connected operatively with the bails by the employment of the hooks 13, which project from the end portions of the platform and are fitted loosely around the cross-bars of the bails. The hooks are produced by bending the ends of suitable bars 14 upon themselves, and these bars range lengthwise of the platform, to the under side of which said bars are fastened in any desirable way. The hooks are long enough to extend around the cross-bars of the bails and under the platform, thus operatively connecting the platform to the bails and permitting the parts to have the necessary vertical travel within the limits required for the operation of the weighing mechanism; but in case it is desirable or necessary to remove the platform from the scale mechanism, as in cleaning the refrigerator, the platform and the bails may be raised to the abnormal position indicated by dotted lines toward the upper part of Fig. 4, whereby the bails will move toward each other and disengage their cross-bars from the hooks of the platform, thus allowing the operator to remove the platform from the chest, after which said platform may be replaced and the parts restored to their normal positions by making the hooks engage with the bails.

The counterbalance devices for the platform and its load are shown by Figs. 2, 3, and 5 as consisting of weighted levers and coil-springs, and these devices are connected operatively with the platform by a vertically-movable stirrup 15, the latter being arranged in a vertical position at one side of the ice-chest, so as to straddle one of the side walls thereof. In the bottom of the ice-chest is an opening 16, through which passes one leg, $15^a$, of the stirrup, said leg terminating in a horizontal arm $15^c$, which lies below the platform and is connected detachably thereto by any suitable form of removable fastener. The other leg, $15^b$, of the stirrup lies outside of the ice-chest, and this stirrup-leg is confined in a suitable guideway, so as to be limited to movement in a rectilinear path. For reducing the friction on the stirrup we prefer to employ pairs of antifriction-rollers 17, which are mounted in pairs on the ice-chest and have engagement with the respective sides of the stirrup, said rollers holding the stirrup in its required vertical position and permitting it to have the necessary vertical play with a minimum amount of friction between the engaging surfaces of the stirrup and its guideway. The leg $15^b$ of the stirrup is provided at a point intermediate of its length with a cross-piece 18, to the end portions of which are fastened the lower ends of the counterbalance-springs 19, the upper ends of said springs being anchored to the ice-chest B. The springs lie on opposite sides of the stirrup, they are disposed compactly between the refrigerator and the ice-chest, and they act equally on the stirrup through the medium of the cross-piece.

The ice-chest is provided in the wall next to the stirrup with a horizontal slot 20, in which are arranged to travel the friction-rollers 21, that are connected by pins or studs 22 to the levers 23, said rollers constituting the fulcra of the levers and being free to have a limited travel in the slot of the ice-chest. The levers are provided with inclined arms 24 at their inner ends, said arms being disposed in cross relation and overlapping the leg $15^b$ of the stirrup, whereby the arms of the levers and the stirrup are connected operatively together by the employment of a single pivotal pin or bolt 25. The levers 23 are equipped with counterpoise-weights 26, which are fitted on said levers for adjustment lengthwise thereof, each weight being clamped by a binding-screw 27 to one of the levers. The weights and the levers are arranged in the space B' between the refrigerator and the ice-chest in order to compactly dispose the parts, and it is found that the weights have a tendency to ride frictionally against a wall of the ice-chest. To minimize the frictional engagement between the weights and the ice-chest, we equip each weight with a ball-bearing, and in the form of construction shown the weight is provided in one of its faces with a recess 28, which receives the bearing-ball 29, the latter being held in place by and exposed through a retaining-plate 30, that is fastened in a suitable way to the weight, whereby the bearing ball is adapted to ride against the wall of the ice-chest.

In connection with the described scale mechanism we employ a suitable indicating device to denote the weight of the load imposed on the platform, and in the preferred form of construction this indicating device is located outside of the refrigerator in order that the weight of the load may be ascertained at a glance; but it should be understood that the particular location of the indicator is not important.

As shown, the refrigerator is provided with a vertical slot 31 directly in front of the stirrup, and in this slot is arranged to play a horizontal pin or stem 32, which is fastened securely to the leg $15^b$ of the stirrup in order to be movable therewith. This pin carries a pointer 33, which is arranged to traverse a graduated plate 34, the same being marked to indicate the weight in pounds and multiples thereof. This dial or plate is held in place by a suitable skeleton frame 35, fastened to the refrigerator, and the dial with the pointer are protected from access by a suitable transparent cover 36 of glass or other material.

To prevent the ice from striking against the bails or the gear-segments thereof when it is deposited in the ice-chest, we provide the guard plates or shields 37, one of which is arranged over the bails and the segments at each side of the ice-chest. Each guard is flanged at the top and bottom edges in order that the guard may be spaced relatively to the side of the chest for the bail and the segment to play within said guard, and the flanged edges of the guard are fastened, as by rivets, to the side and bottom of the chest.

The counterpoise devices tend to normally sustain the platform and the stirrup in the raised positions indicated by full lines in Figs. 2 and 4 of the drawings; but when a load of ice is deposited on the platform the latter is depressed toward the bottom of the ice-chest, as indicated by dotted lines at the lower part of Fig. 4. This downward movement of the platform is communicated to the stirrup, which expands the springs and raises the weighted levers, and the weight of the load on the platform is indicated by the position of the pointer on the dial, thus enabling the owner to ascertain at a glance the weight of the ice deposited in the refrigerator.

Our improved scale mechanism may be employed not only to ascertain the weight of the ice, but it can also be used as a household scale for weighing articles of food generally and for various other purposes.

We are aware that changes in the form, size, proportion, and minor details of construction may be made without sacrificing the advantages of our invention, and we therefore reserve the right to make such alterations as fall within the scope of the invention defined by the annexed claims.

Having thus fully described our invention, what we claim as new, and desire to secure by Letters Patent, is—

1. A refrigerator, or the like, having a plurality of levers arranged in an ice-chamber thereof, said levers being pivoted near their inner ends, means for connecting said ends and insuring their conjoint movement, a load-platform supported on the other ends of said levers, a counterpoise for the platform, a visual indicator installed permanently in the refrigerator independently of said levers, and indicator-operating devices extending through the ice-chamber and operatively related to the platform and the indicator for operating the latter by the rise and fall of said platform.

2. A refrigerator, or the like, having weighing-bails fulcrumed near their ends in an ice-chamber of said refrigerator, said bails being operatively connected at said inner ends for conjoint movement, a load-platform supported on and connected removably to the other ends of said bails, an indicator provided with a moving part; an operating member connected with the platform and said moving part of the indicator, and a counterpoise connected to said operating member whereby the counterpoise opposes the movement of the platform through said member and the latter operates the indicator on the rise and fall of the platform.

3. A refrigerator, or the like, having weighing-bails provided with cross-bars, said weighing-bails being fulcrumed in an ice-chamber of said refrigerator, said bails being operatively connected for conjoint movement, a load-platform supported by and connected detachably to the cross-bars of said weighing-bails, a counterpoise for the platform, a visual indicator independent of the weighing-bails, and means controllable by the travel of the platform for actuating said indicator.

4. A refrigerator, or the like, having an ice-chamber and equipped with a weighing mechanism, the latter including a platform, a counterpoise therefor, a visual indicator, and a vertically-movable stirrup straddling one wall of the ice-chamber, said stirrup coöperating with the platform and the visual indicator.

5. A weighing mechanism having bails in coöperative relation for conjoint and equal movement, a platform, a stirrup movable with the platform, counterpoised levers connected with the stirrup, counterpoise-springs connected to the stirrup, and an indicator controllable by the stirrup.

6. A refrigerator, or the like, having an ice-chamber and equipped with a weighing mechanism, said mechanism including a platform located in the ice-chamber, a counterpoise situated outside of said ice-chamber, a member straddling a wall of the ice-chamber and connecting the counterpoise with said platform, and a visual indicator controllable by the travel of the platform.

7. The combination with an ice-chest, of intermeshing bails therein, a platform supported by the bails, a stirrup connected with the platform and arranged to play in the chest, a counterpoise connected with the stirrup, and an indicator.

8. The combination with an ice-chest, of bails fulcrumed near their inner ends and located within said chest, a platform connected removably to the outer ends of said bails, means for connecting the inner ends of said bails and insuring conjoint operation thereof, a member movable with the platform, a counterpoise opposing the movement of the platform through said member, and a visual indicator independent of the bails and actuated by said member.

9. The combination with an ice-chest, of intermeshing bails mounted therein, a platform having hooks fitted to the bails for supporting the platform thereon and for permitting its removal from the bails, a member movable with the platform, a counterpoise connected with said member, and an indicator.

10. The combination with an ice-chest, of a pair of bails provided with geared segments which are fulcrumed in the chest and have intermeshing engagement to adapt the bails for conjoint and equal movement, a platform supported by the bails, a counterpoise for the platform, and an indicator controllable by the platform.

11. The combination with an ice-chest, of intergeared bails fulcrumed therein, a platform supported by the bails, a stirrup straddling the ice-chest and movable with the platform, counterpoised levers having shiftable fulcra on the chest and connected to the stirrup, and an indicator controllable by the travel of the stirrup.

12. The combination with an ice-chest, of intergeared bails mounted therein, a platform, a stirrup movable with the platform, means for limiting the stirrup to vertical movement with relation to the chest, a counterpoise connected to the stirrup, and an indicator controllable by the travel of the stirrup.

13. The combination with an ice-chamber, of connected bails mounted in said chamber for swinging movement on horizontal axes, a platform in said chamber and carried by said bails, a stirrup straddling a wall of the ice-chest and connected with the platform for movement therewith, a counterpoise mechanism connected to said stirrup and located between adjacent walls of the refrigerator and the ice-chamber, and a visual indicator controllable by the travel of the stirrup.

14. The combination with an ice-chamber, of connected bails pivoted in said chamber, a platform supported by said bails within the chamber, a stirrup connected to said platform and having a leg arranged to play in a space between adjacent walls of the refrigerator and the ice-chamber, means for limiting the stirrup to vertical movement, a counterpoise situated between the walls of the refrigerator and the ice-chamber and operatively connected to the leg of said stirrup, and an indicator controllable by the movement of the platform.

15. The combination with an ice-chest, of a platform movable therein, a stirrup connected to the platform, a guide for said stirrup, levers pivoted to the stirrup, and weights carried by the levers and having antifriction engagement with the chest.

JOHN B. SALO.
ANDREW H. HOAG.

Witnesses:
H. I. BERNHARD,
R. B. CAVANAGH.